Figure 1:
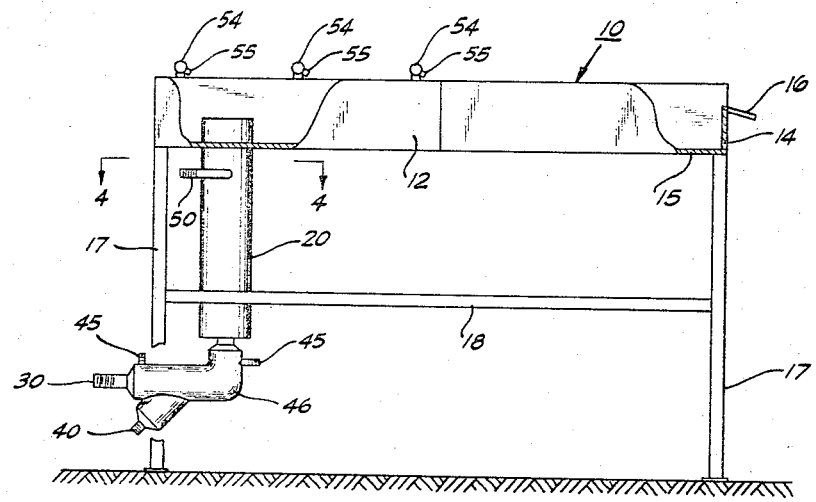

INVENTOR.
DAVID J. WATANABE
BY
ATTORNEY

INVENTOR.
DAVID J. WATANABE
BY
ATTORNEY

United States Patent Office 3,329,994
Patented July 11, 1967

3,329,994
APPARATUS FOR PRODUCING A SOLID PARTICULATE MATERIAL
David J. Watanabe, Orange, Calif., assignor to Union Oil Company of California, Los Angeles, Calif., a corporation of California
Filed Dec. 2, 1966, Ser. No. 598,735
21 Claims. (Cl. 18—2.4)

This application is a continuation-in-part of application Ser. No. 300,060, filed Aug. 5, 1963.

This invention relates to apparatus for producing a solid particulate material, and more particularly to apparatus for producing solid particles from a molten or solidifiable liquid mass. More specifically, the invention relates to apparatus for forming a solidifiable molten material into substantially spheroidal solid beads of relatively uniform small size. The apparatus of this invention is particularly adapted to the production of substantially spheroidal homogeneous hydrocarbon-polymer particles of relatively uniform small size.

It is often necessary to convert bulk quantities of a molten substance, or of a substance which can be melted, into finely divided solid particles of substantially spheroidal shape and relatively uniform small size. In particular, need exists for means to convert bulk quantities of various hydrocarbon-polymer compositions into substantially spheroidal particles of relatively uniform small size for use as temporary sealing or plugging agents, propping agent spacers, viscosity increasers, fluid loss additives and selective permanent plugging agents useful in the drilling of oil and gas wells and in treating subterranean petroleum producing formations. Heretofore, it has been necessary to accomplish the required particulation by molding, prilling, spray drying, extruding, shredding, disintegrating, and the like. However, these techniques are not wholly satisfactory and have obvious disadvantages in terms of high capital and operating costs, material waste, poor efficiency, and/or low production capacity.

A particularly efficient method for forming a solidifiable material into substantially spheroidal solid particles of relatively uniform small size has been proposed. According to this method, a molten material to be particulated, such as a molten homogeneous mixture of hydrocarbon and organic polymer, is injected into a flowing nonsolvent fluid body which has been heated to a temperature above the melting point of the material to be particulated, under conditions whereby the force of the nonsolvent stream causes subdivision of the injected stream into discrete droplets. The droplets are then passed into a quiescent zone so as to attain a spheroidal shape. The nonsolvent liquid system containing the dispersed droplets is then cooled to solidify the droplets, which are then recovered from the solvent system as discrete solid particles. In a preferred embodiment, cooling is accomplished by admixing the dispersion of solidifiable material in hot nonsolvent liquid with an additional quantity of cold nonsolvent liquid.

Accordingly, it is an object of the present invention to provide apparatus for efficiently forming a solidifiable material into finely divided solid particles. Another object of this invention is to provide apparatus for particulating a material according to the aforementioned method. A still further object is to provide apparatus for particulating a solidifiable material according to the aforementioned method which employs a minimum of nonsolvent liquid. These and related objects will be apparent to those skilled in the art from the following description.

Briefly, the present invention involves an improved apparatus for continuously producing a particulated solid from a molten liquid. The apparatus comprises means for continuously injecting a small stream of the molten liquid through an injection nozzle and into a conduit adapted to conduct nonsolvent liquid past the injection nozzle at a velocity sufficient to shear the injected material from the nozzle in small droplets. The nonsolvent liquid conduit discharges into the bottom of an elongated vertical chimney having an open top and also having means for tangentially admitting a quantity of cool nonsolvent liquid at an intermediate point along its vertical length. The vertical chimney has a substantially larger diameter than the nonsolvent liquid conduit so that the velocity of the dispersion moving upwardly within the chimney will be relatively low. The vertical chimney discharges into a horizontal reservoir adapted to contain a body of nonsolvent liquid and from which solid particles of the solidifiable material can be recovered.

Figure 2:
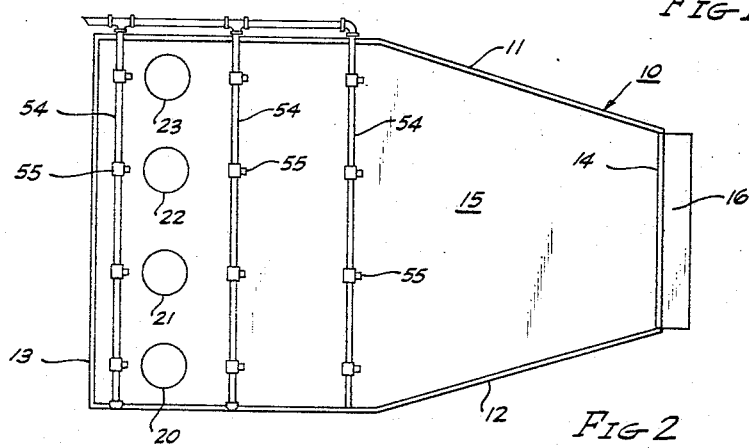
Figure 3:
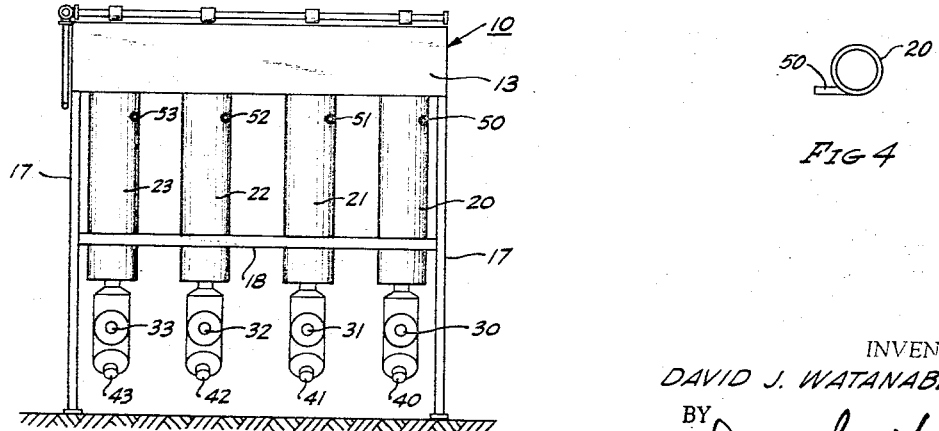
Figure 4:
Figure 5:
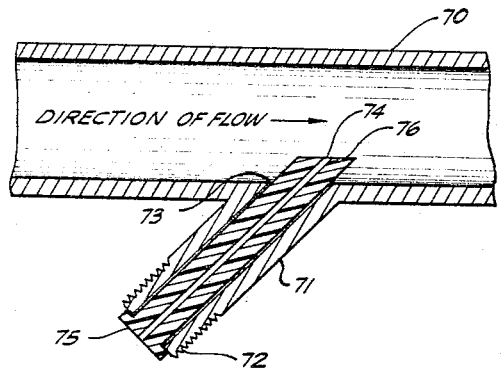
Figure 6:
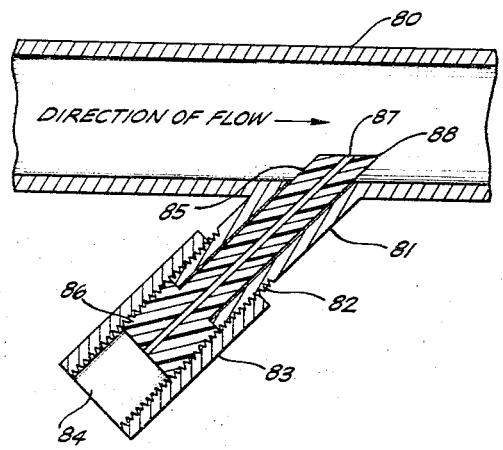
Figure 7:
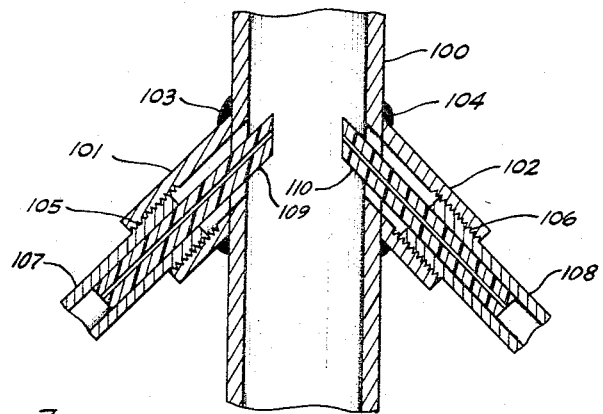

The invention will be more readily understood by reference to the following detailed description and accompanying drawings, of which:

FIGURE 1 is a partially cutaway side elevation of the apparatus of this invention;
FIGURE 2 is a plan view of the apparatus;
FIGURE 3 is an end view of the apparatus;
FIGURE 4 is a cross-sectional view of a vertical chimney;
FIGURE 5 is a detail of a section of the nonsolvent liquid conduit, in cross-section, showing the internal mounting of the injection nozzle;
FIGURE 6 is a detail of a section of the nonsolvent liquid conduit, in cross-section, showing another embodiment of injection nozzle; and
FIGURE 7 is a detail of a section of the nonsolvent liquid conduit, in cross-section, showing still another embodiment of injection nozzle.

The apparatus of this invention is essentially comprised of means for dispersing finely divided droplets of a molten liquid into a heated flowing stream of nonsolvent liquid, means for according the finely divided droplets a substanially spheroidal shape while maintaining the dispersed material in a molten state, and means for solidifying the dispersed spheroidal droplets to produce discrete solid spheroidal particles. The dispersion of molten liquid in nonsolvent liquid is conveniently formed by injecting a small stream of the molten liquid into a stream of nonsolvent liquid which has been heated to a temperature above the solidification temperature of the molten substance and which is flowing through a conduit at a sufficiently high velocity to shear the injected molten liquid into relatively small droplets dispersed in the nonsolvent liquid. This dispersion can be conveniently formed without mechanical assistance by injecting the molten substance through a nozzle inserted into the stream of flowing liquid transverse to the axis of flow. The molten liquid emerging from the nozzle is shreaded from the nozzle tip by the flowing nonsolvent liquid stream and conveyed by the nonsolvent liquid through the nonsolvent liquid conduit in the form of discrete droplets dispersed in the nonsolvent liquid.

The nonsolvent liquid conduit is connected to a vertical chimney adjacent its bottom so that the dispersion of liquid droplets in the nonsolvent liquid passes upwardly through the chimney at reduced fluid velocities, the droplets also rising through the slowly moving body of nonsolvent liquid due to the difference in density of the immiscible liquids. The diameter of the vertical chimney is relatively large in comparison to the diameter of the nonsolvent liquid conduit so that the liquid velocity is substantially reduced in the vertical chimney to provide a relatively quiescent zone wherein the surface tension of the dispersed molten liquid will cause the droplets to form into substantially spheroidal shapes. After the droplets have passed along a sufficient length of the vertical chimney to attain a substantially spheroidal shape, the dispersion is admixed with additional cool nonsolvent liquid in sufficient quantity to at least partially solidify the dispersed spheroidal droplets so as to form discrete solid spheroidal particles. Preferably, the cool nonsolvent liquid is admixed into the liquid dispersion in a manner which does not cause a substantial change in shape or agglomeration of the dispersed material on solidification.

A preferred embodiment of apparatus for continuously forming a molten liquid into solid particles is illustrated in the drawings. Generally, the apparatus comprises a plurality of nonsolvent liquid conduits and molten liquid injection nozzles discharging into a like plurality of vertical chimneys which terminate below the surface of a body of nonsolvent liquid maintained in a nonsolvent liquid reservoir. Means are provided for injecting cool nonsolvent liquid at an intermediate point along the length of the vertical chimneys, and for spraying additional cool nonsolvent liquid onto the surface of the body of liquid in the nonsolvent liquid reservoir. The capacity of a particle-forming unit in accordance with this invention is in part dependent upon the number of individual dispersion-producing assemblies and vertical chimneys employed. While the illustrated apparatus has four such separate systems discharging into a common reservoir, it is to be recognized that the apparatus can be adapted for any convenient number of such systems. For example, the apparatus is fully operable with but a single dispersion-producing assembly and a single vertical chimney, or alternatively, a plurality of such structures can be combined with a single reservoir.

Referring particularly to FIGURES 1, 2 and 3, the main body of the apparatus comprises the reservoir 10 adapted to hold a body of liquid. While the reservoir 10 can be of any convenient structure, it is preferred that the reservoir be adapted to hold a shallow body of liquid, such as contained by the illustrated horizontal, flat-bottom shallow tank formed by side members 11 and 12, end members 13 and 14, and by bottom member 15. In the preferred embodiments, an inlet section of the tank comprises a generally square or rectangular configuration and on outlet section thereof is generally trapezoidal in shape so that end member 14 is substantially shorter in length than opposite end member 13. End member 14 is lower in height than the other of the end or side members, thereby forming an overflow weir which maintains the body of fluid contained in the reservoir 10 at a fixed level. End member 14 is provided with lip 16, which can be integrally formed therewith, to direct overflowing liquid away from the tank. Alternatively, the end member 14 can be cut away along only a portion of its length to form the weir. Also, other means for removing liquid from the reservoir 10 while maintaining the liquid level at a fixed height can be employed, e.g., an overflow standpipe of fixed height, etc. The tank and its liquid contents are supported by any convenient means, such as the legs 17 and cross members 18.

Four similar vertical conduits or chimneys 20, 21, 22 and 23 are arranged adjacent end 13 of the tank. These chimneys are cylindrical in cross-section and generally disposed below the tank, the chimneys passing upwardly through bottom member 15 and each having an open terminus below the level of liquid maintained by the weir 14. Thus, the chimneys can be installed so that their upper termini are flush with the bottom member 15, or the chimney can project upwardly above the bottom member to just below the surface of the liquid body. In another embodiment, not illustrated, a relatively deep reservoir can be employed and the vertical chimneys can be entirely disposed within the reservoir.

Nonsolvent liquid conduits 30, 31, 32 and 33 are connected to the vertical chimneys 20, 21, 22 and 23, respectively, adjacent their bottom closed termini. These conduits are adapted for connection to a source of nonsolvent liquid supply through appropriate piping connections, not shown. Molten feed material is injected through the conduits 40, 41, 42 and 43, which are respectively connected to nonsolvent liquid conduits 30, 31, 32 and 33. The feed material conduits are adapted for connection to a suitable source of molten feed material supply through appropriate piping connections, also not illustrated. It is preferred that the feed injection conduits be connected to the bottom of a horizontal section of the nonsolvent liquid conduits so that the molten feed material is injected transverse to the axis of the nonsolvent liquid conduit, or alternatively, into a vertical conduit through which fluid is flowing in an upward direction. It is also advantageous to provide the nonsolvent liquid and molten feed material conduit assemblies with steam tracings 45 and insulation 46, especially where the molten feed material solidifies at higher than ambient temperatures.

Cool nonsolvent liquid inlet connections 50, 51, 52 and 53 are provided at intermediate points in each of vertical chimneys 20, 21, 22 and 23. These connections are preferably arranged so that the cool nonsolvent liquid is injected tangentially into each of the vertical assemblies. A typical tangential connection is illustrated in FIGURE 4 wherein the lateral 50 is shown tangentially connected to chimney 20. Spray headers 54 having a plurality of spray nozzles 55 are arranged to direct a stream of cool nonsolvent liquid onto the surface of the liquid body maintained in the reservoir. Thus, the solid particles floating on the surface of the liquid in the reservoir are preferentially cooled without substantially lowering the temperature of the entire body of liquid in reservoir 10.

The axis of injection of the molten liquid flowing at a relatively high velocity into the moving nonsolvent liquid stream is preferably located at an acute angle relative to the flow axis of the moving nonsolvent stream. This angular blend injection is preferably in an upward direction into a horizontally moving nonsolvent liquid stream, i.e. for best results the molten liquid should not be injected at an angle downwardly into the moving stream. Furthermore, while any transverse injection such as vertical or perpendicular injections is operable, other injection systems are not usually as satisfactory as the aforesaid acute angular injection. Also, where the axis of angular injection intersects the axis of the nonsolvent liquid stream, the injected molten liquid stream has a flow velocity component in the same direction as the direction of flow of the hot nonsolvent liquid stream. The acute angle between the axis of these two intersecting streams, i.e., nonsolvent liquid and hydrocarbon-polymer blend, is preferably any angle substantially less than 90 degrees, and particularly those angles between about 15 degrees and about 75 degrees, with a particularly efficacious and convenient angle of injection occurring at about 45 degrees. Although the foregoing injection angles are preferred, any injection transverse to the axis of flow of the nonsolvent liquid stream is operable in producing particle separation.

While any convenient means for accomplishing the aforementioned angular injection of molten liquid into the nonsolvent liquid stream can be employed, a preferred injection means is illustrated in FIGURE 5. In this embodiment, a horizontal section 70 of the nonsolvent liquid conduit is provided with branch lateral 71 angularly connected to the bottom of the conduit 70 and disposed at an angle of between 15 and 75 degrees in the direction of fluid flow through conduit 70, and preferably at an angle of 45 degrees therewith. Branch lateral 71 is provided with treads 72 for connection of a molten liquid supply conduit, not illustrated. Nozzle 73 comprises an elongated section of plastic, such as Teflon, a well known polymerized tetrafluoro ethylene, axially drilled to provide a fluid passage 74 extending the length of the section 73. The diameter of the passage 74 in part determines the size of particles produced, and can conveniently be between about 0.05 and 0.5 inch. It has been found that a fluid passage diameter of 0.1 inch is particularly suited for the production of particles having a size within the range of 8 to 100 mesh U.S. sieve. The nozzle 73 is sized to provide a press fit into the branch lateral 71, and is inserted sufficiently that it projects into the conduit 70. Optionally, the flange 75 can be provided to limit the extent to which the nozzle 73 can be inserted into branch lateral 71. Nozzle 73 terminates in the face 76, which is preferably cut at an angle parallel to the axis of conduit 70 when the nozzle is installed in branch conduit 71.

Another embodiment of molten liquid injection nozzle is illustrated in FIGURE 6, wherein is seen a horizontal section of nonsolvent liquid conduit 80 having branch lateral 81 angularly connected thereto at its bottom and disposed at an angle of between about 15 and about 75 degrees in the direction of fluid flow through the conduit 80, and preferably at an angle of 45 degrees therewith. Coupling 83 having internal threads 84 is adapted to threadably engage the threads 82 of branch lateral 81, and also to support the nozzle 85. The coupling 83 can also threadably engage a molten liquid conduit, not shown. Nozzle 85 comprises an elongated section of plastic, such as Teflon, having a terminal threaded base 86 to engage the coupling 83, and which extends into the conduit 80. The nozzle is axially drilled at 87 to provide a fluid passage as previously disclosed. Nozzle 85 terminates in a face 88, which is preferably cut at an angle parallel to the axis of conduit 70 when the nozzle is installed in the branch lateral 81.

The above-described fluid injection nozzles can also be installed in a vertical section of nonsolvent liquid conduit in which the fluid is flowing in an upwardly direction. Also, a plurality of nozzles can be provided in each nonsolvent liquid conduit, whether the conduit is installed in the horizontal or vertical direction. Another embodiment of dual injection nozzle for mounting in a vertical section of nonsolvent liquid conduit and showing a somewhat different mode of installation is illustrated in FIGURE 7. Referring particularly to FIGURE 7, a vertical section of nonsolvent liquid conduit 100 is fitted with lateral connections 101 and 102 which are attached angularly thereto by welding at 103 and 104. Lateral connections 101 and 102 are provided with internal threads 105 and 106 adapted to engage threaded molten liquid conduits 107 and 108. Teflon nozzles 109 and 110, of the aforementioned type, are press fit into the ends of the conduits 107 and 108 so that on installation of the conduits in the appropriate branch connections, the nozzles project into the conduit 100 in the illustrated manner.

Although not particularly illustrated in the drawings, it is obvious that certain auxiliary equipment is necessary for operation of the apparatus of this invention. For example, suitable nonsolvent liquid and molten liquid supply systems are required. These can conveniently be tanks with appropriate transfer pumps and attendant piping. Also, where the nonsolvent liquid is recovered and reused, it may be necessary to provide a heater to heat the hot portion of the nonsolvent liquid and a cooler to cool the cold portion of the nonsolvent liquid. Further, facilities may be required to drain and dry the solid particles, which can be a simple rotary or stationary screen and a low temperature air drier. Since the foregoing auxiliary equipment is conventional, further description will be unnecessary.

While particular embodiments of the invention have been described, it will be understood, of course, that the invention is not limited thereto since many modifications can be made and it is intended to include within the invention any such modifications as fall within the scope of the claims.

The invention having been thus described, I claim:

1. An apparatus for continuously converting a molten liquid into particulated solid particles, which comprises:
   a reservoir adapted to contain a body of liquid;
   a vertical chimney having an open upper terminus within said reservoir below the surface of said body of liquid;
   a conduit connected to said chimney adjacent its lower terminus and adapted to convey nonsolvent liquid to said chimney at relatively high velocity, said conduit having a substantially smaller cross-sectional area than said chimney; and
   means for injecting an immiscible molten liquid into said conduit whereby the molten liquid is dispersed in droplets into the nonsolvent liquid flowing through said conduit and into said chimney.

2. The apparatus defined in claim 1 wherein said elongated vertical chimney is cylindrical.

3. The apparatus defined in claim 1 wherein said elongated vertical chimney is disposed below said reservoir and extends upwardly into said reservoir, terminating above the bottom of said reservoir.

4. The apparatus defined in claim 1 including a second conduit connected to said chimney at a point intermediate the top and bottom termini of said chimney whereby cold nonsolvent liquid can be injected into said chimney.

5. The apparatus defined in claim 4 wherein said second conduit is arranged to inject the cold nonsolvent liquid tangentially into said chimney.

6. The apparatus defined in claim 1 including means for spraying additional cold nonsolvent liquid onto the surface of the liquid contained in said reservoir.

7. The apparatus defined in claim 1 wherein said means for injecting said molten liquid into said conduit comprises an injection nozzle projecting into said conduit.

8. The apparatus defined in claim 7 wherein said injection nozzle projects into said conduit at an angle inclined in the direction of flow through said conduit of between about 15 and about 75 degrees from the axis of said conduit.

9. The apparatus defined in claim 8 wherein said injection nozzle is installed in the bottom of a horizontal section of said conduit.

10. The apparatus defined in claim 8 wherein said injection nozzle is installed in a vertical section of said conduit through which the nonsolvent liquid flows in an upwardly direction.

11. The apparatus defined in claim 8 wherein the tip of said nozzle comprises a flat face disposed at an angle parallel with the axis of said conduit.

12. The apparatus defined in claim 7 wherein said injection nozzle is comprised of Teflon.

13. The apparatus of claim 7 wherein a plurality of injection nozzles are installed in each conduit.

14. The apparatus defined in claim 1 including a plurality of vertical chimneys, each of said chimneys having a first nonsolvent liquid conduit and molten liquid injection means connected thereto adjacent the bottom of said chimney, and a second cold nonsolvent liquid conduit connected intermediate the length of said chimney.

15. An apparatus for continuously converting a molten liquid into a particulated solid, which comprises:
   a shallow horizontal tank having a flat bottom and an overflow weir to maintain a fixed level of liquid within said tank;
   a plurality of elonyated vertical chimneys of relatively large cross-sectional area extending upwardly through the bottom of said tank, each of said chimneys having an open terminus above the bottom of said tank and below the level of liquid maintained by said weir;
   at least one relatively small diameter conduit communicating with each of said vertical chimneys adjacent the lower termini of said chimneys;
   an injection nozzle projecting into each of said conduits at an angle inclined in the direction of flow through said conduit of between about 15 degrees and about 75 degrees from the axis of the conduit;
   means for tangentially injecting liquid into each of said vertical chimneys intermediate the top and bottom termini of said chimneys; and means for spraying a liquid onto the surface of the liquid maintained in said tank.

16. The apparatus defined in claim 15 wherein said vertical chimneys are cylindrical.

17. The apparatus defined in claim 15 wherein said injection nozzle is installed in the bottom of a horizontal section of said conduit.

18. The apparatus defined in claim 15 wherein said injection nozzle is installed in a vertical section of said conduit through which the nonsolvent liquid flows in an upwardly direction.

19. The apparatus defined in claim 15 wherein the tip of said nozzle comprises a flat face disposed at an angle parallel with the axis of said conduit.

20. The apparatus defined in claim 15 wherein said injection nozzle is comprised of Teflon.

21. The apparatus defined in claim 15 wherein a plurality of said injection nozzles are installed in each conduit.

References Cited

UNITED STATES PATENTS

| | | | |
|---|---|---|---|
| 1,746,543 | 2/1930 | Lowry | 18—2.5 XR |
| 2,543,132 | 2/1951 | Shabaker | 18—2.5 XR |
| 2,918,701 | 12/1959 | Hull et al. | 18—2.4 XR |
| 2,947,115 | 8/1960 | Wood | 18—2.4 XR |

WILLIAM J. STEPHENSON, *Primary Examiner.*